(12) United States Patent
Koumura et al.

(10) Patent No.: US 6,385,714 B1
(45) Date of Patent: May 7, 2002

(54) DATA PROCESSING APPARATUS

(75) Inventors: Yasuhito Koumura, Taitou-ku; Hiroki Miura, Kawaguchi; Kenshi Matsumoto, Koshigaya, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/154,002

(22) Filed: Sep. 16, 1998

(30) Foreign Application Priority Data

Sep. 18, 1997 (JP) .............................................. 9-253969

(51) Int. Cl.[7] .......................... G06F 9/22; G06F 9/305; G06F 9/30; G06F 9/345; G06F 9/38
(52) U.S. Cl. .......................... 712/219; 712/41; 712/245; 712/223; 712/217; 711/214
(58) Field of Search ............................... 712/2, 3, 4, 5, 712/6, 13, 14, 16, 17, 18, 19, 23, 24, 26, 27, 32, 225, 34, 25, 245, 211, 210, 217, 230, 218, 219, 221, 41, 223; 711/214, 220; 710/29, 26; 708/490, 520

(56) References Cited

U.S. PATENT DOCUMENTS

| | | | |
|---|---|---|---|
| 5,197,132 A | 3/1993 | Steely, Jr. et al. | 712/217 |
| 5,233,695 A | 8/1993 | Miyoshi | 712/212 |
| 5,581,721 A | 12/1996 | Wada et al. | 712/200 |
| 5,655,132 A | 8/1997 | Watson | 709/104 |
| 5,684,983 A | 11/1997 | Ando | 712/225 |
| 5,729,723 A | 3/1998 | Wada et al. | 712/222 |
| 5,991,870 A | 11/1999 | Koumura et al. | 712/208 |
| 6,034,891 A | * 3/2000 | Norman | 365/185.09 |
| 6,175,910 B1 | * 1/2001 | Pauporte et al. | 712/217 |

FOREIGN PATENT DOCUMENTS

JP 9152971 6/1997

OTHER PUBLICATIONS

David A. Patterson, "Computer Architecture A Quantitative Approach", Morgan Kaufmann Publishers, Inc.

* cited by examiner

Primary Examiner—Daniel H. Pan
(74) Attorney, Agent, or Firm—Pillsbury Winthrop LLP

(57) ABSTRACT

A data processing apparatus uses a stored-program method to execute an operation instructed by an instruction word that includes a register designation code as an operand. A plurality of work registers are identifiable by register numbers, each of a typical number of bits. A correspondence table holds at least one of the register numbers in a state corresponding to register designation codes. The codes are stored in a readable condition, and have fewer bits than the register numbers. The data processing apparatus refers to the correspondence table when executing the operation.

17 Claims, 3 Drawing Sheets

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | CPS2 | | | | CPS1 | | | | PPPD | | | | PPD | | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | PD | | | IE | | | EA | | | T | Z | N | V | C |

Fig. 2

```
<<PROCESS FOR FUNCTION A (IE=9, ALLOW NMI AND
  INTERRUPTION WITH LEVEL 1 - 9)>>
...
<<GENERATE INTERRUPT (LEVEL 9)>>
                        ERP ← return PC
                        EA ← 0 (disable all interrupt)
                        PC ← handler address
    <<INTERRUPT HANDLER>>
```

| LINE NUMBER | | | |
|---|---|---|---|
| 1 | STS.MB | STAT,-1(R15) | (SAVE STAT IN STACK REGION) |
| 2 | STS.MB | ERP,-1(R15) | (SAVE ERP IN STACK REGION) |
| 3 | SETPR | 8 | (IE←8, EA=1, ALLOW NMI AND INTERRUPTION WITH LEVEL 1 - 8) |
| ... | | | |
| 100 | LDS.MA | ERP,1(R15) | (pop FROM STACK REGION TO TRANSFER TO ERP EA=0, DISALLOW INTERRUPTION) |
| 101 | LDS.MA | STAT,1(R15) | (pop FROM STACK REGION TO TRANSFER TO STAT) |
| 102 | NOP | | |
| 103 | RETI | | (RETURN INSTRUCTION FROM INTERRUPTION) EA ← 1 (RETURN EA TO 1) PC ← ERP (RETURN TO FUNCTION A) |
| 104 | NOP | | (DELAY SLOT INSTRUCTION (BRANCH DELAY)) |

```
<<RESUME PROCESS FOR FUNCTION A (IE=9, ALLOW NMI
  AND INTERRUPTION WITH LEVEL 1 - 9)>>
...
```

Fig. 3

DATA PROCESSING APPARATUS

BACKGROUND OF THE INVENTION

1. Field of the Invention

The present invention relates to a data processing apparatus comprising a plurality of work registers, and more particularly to a data processing apparatus which can respond to an instruction for a processing by executing a process using a plurality of work registers.

2. Description of the Related Art

A data processing apparatus having a plurality of work registers called a general-purpose register can understand a variety of instructions. One such instruction can simultaneously designate two or more register operands. For example, a typical operation instruction according to a conventional architecture called RISC can simultaneously designate three registers. The three registers may include, with respect to an add operation instruction, two source registers and one destination register. With such an instruction, two values are retrieved from the two source registers to be added, and the operation result is then stored in the destination register. This method is referred to as a three-register-operand method. A two-register-operand method using an instruction designating two register operands for an operation is also known.

The three-register-operand method requires a fewer number of steps to execute certain operations as compared to the two-register-operand method. That is, when the two-register-operand method is used, one of the source registers is always overwritten by the operation result, which creates a need for one additional step. Specifically, if two or more operation instructions simultaneously designate the same value stored in the same register, that value may need to be first copied to another register before the respective operations are executed. An illustrative example is a case to execute a process in which two values are read from registers rs1 and rs2, respectively, to be used in a binomial operation, and the operation result is stored in a register rd. It is possible to designate the whole process using one instruction according to the three-register-operand method, while it is not possible according to the two-register-operand method. That is, with the two-register-operand method, two instructions are necessary to achieve the above; one for copying a value read from the register rs1 to the register rd, and the other for executing a binomial operation using the copied value and the value read from the register rs2 and storing the operating result in the register rd.

The three-register-operand method can effectively reduce the number of instructions, i.e., the number of cycles in which a concerned program is executed. However, an instruction according to this method is lengthy as it includes a larger number of operands than that of the two-register-operand method, which works against the common demand for shorter basic instructions. An example would be a case wherein a data processing apparatus comprising sixteen general-purpose registers employs a 16-bit instruction as a basic instruction. A field of 12 bits is used to designate three register operands, leaving a four-bit field available to contain encoded data regarding the types of an instruction or an operation. This field is, however, not sufficient to do so.

As a method free from the above problem and capable of designating a register operand using an instruction of a shorter length, Japanese Patent Application No. Hei 7-313146 discloses an instruction preparing method and a register designating method.

According to these methods, at least one register designation field consists of a fewer number of bits than other register designation fields. This shorter field is used to hold a register designation code, but not a register number itself used for explicit designation of a register. The register designation code is set corresponding to a register number by a correspondence table. By using m number of bits, $2^m$ number of different register codes can be defined. In other words, $2^m$ number of registers of all general-purpose registers can be indirectly designated through reference to a corresponding table.

An arrangement in which correspondence between a register designation code and a register number is dynamically changed as a program is being executed has also been proposed but, in general, a correspondence table is used, when a received instruction includes a certain register designation code as an operand, to determine the number of a register designated by the code so that the aimed work register is accessed. Conventionally, a structure for this type of process is achieved by means of, for example, hardware or firmware. Therefore, the register numbers set in the correspondence table are available only for reference, and are not available for use as data when executing a program. This is inconvenient for designers attempt to achieve more precise and flexible control over the data processing apparatus.

In particular, in a case where the content of the correspondence table is changed while a program is being executed, if an interrupt process is received, causing exceptional changes in the operating flow of the ongoing program, the content of the correspondence table which has been built up through the processing of the interrupted program, may be updated during the interrupt processing. Therefore, when the interrupted program is resumed upon completion of the interrupt processing, the correspondence table no longer has the same content as that immediately before the interruption. This may hinder returning to the operating flow.

Also, since all register numbers cannot be designated by register designation codes, selection must be made to determine which work registers are set accessible based on register designation codes. Conventionally, this selection is not always preferable in view of achieving effective processing.

SUMMARY OF THE INVENTION

The present invention has been conceived to overcome the above problems and aims to provide a data processing apparatus which is compatible with the three-register-operand method and which uses instructions reduced in length through employment of a register designation code. Particularly, this apparatus ensures high efficiency in executing a program, and properly resumes a program which was interrupted by other interrupt programs.

According to the present invention, there is provided a data processing apparatus using a stored-program method for executing an operation instructed by an instruction including a register designation code as an operand, comprising: a plurality of work registers identifiable by register numbers each of a typical number of bit length; and a correspondence table for holding at least one of the register numbers as designated register numbers in a state corresponding to register designation codes each of a less than the typical number of bits (standard bit number) and in a readable condition, the correspondence table being referred to by the data processing apparatus when executing the operation.

It may be preferable for the above data processing apparatus to further comprise register number obtaining section for obtaining the designated register number from the correspondence table.

Conventionally, the register numbers, set in the correspondence table and corresponding to register designation codes, are available only for reference so that the data processing apparatus can access a working register based on a register designation code. According to this invention, on the other hand, the register numbers held in the correspondence table can be read in response to, for example, an instruction included in a program, to be used as data.

Further, the above data processing apparatus further comprises designated register number storing section for storing the designated register number read from the correspondence table.

According to the present invention, when the operating flow is changed, such as branching from the main routine processing of the ongoing program to a different process, including a sub-routine or an interrupt or exception handler, the register numbers then held in the correspondence table which are relevant to the ongoing processing, are obtained from the table by the register number obtaining section, and stored in the designated register number storing section before beginning the different process.

With this arrangement, even if the content of the correspondence table should be updated during the interrupt processing, the designated register numbers relevant to the discontinued processing is not lost as is stored in the storing means during the interrupt processing.

A data processing apparatus as described above may further comprise designated register number returning section for returning the designated register number stored in the designated register number storing section back to the correspondence table.

According to the present invention, after the interrupt processing is completed, the content of the correspondence table stored in the storing section is returned to the correspondence table before the operating flow returns to the discontinued process to resume the processing.

With this arrangement, the discontinued processing can be resumed normally with the correspondence table holding the same content as that at the time of interruption.

In data processing according to the present invention, the designated register number storing section may store a number of the designated register numbers read from the correspondence table, and the designated register number returning section may then read the number of the designated register numbers from the designated register number storing section in the reverse order in which the number of the designated register numbers were stored in the register number storing section, and then return them to the correspondence table.

According to the present invention, even in a stepwise branching in which, for example, a process which interrupted a certain program is further interrupted by another process, the content of the table is stored to the designated register number storing means every branching. Further, a number of content of the table stored in the storing means are returned to the table in an inverse order to which they were stored, every time when the operating flow returns to the most recently interrupted process after the completion of the interrupt processing. That is, table content is stored and returned in an inverse order.

The above data processing apparatus may also execute specific processing, besides normal processing, in response to a process request supplied from either inside or outside thereof, and may further comprise designated register number updating section for updating the designated register number following a predetermined rule according to the execution of an instruction word; and correspondence table updating allowance/disallowance setting section for allowing or disallowing updating of the designated register number held in the correspondence table. In such a configuration, the designated register number storing section will store a process for storing the designated register number in response to the acceptance of the request for the specific processing, and the correspondence table updating allowance/disallowance setting section will disallow updating of the designated register number held in the correspondence table in a period covering the process for storing the designated register number.

The term "normal processing" used here refers to, for example, main routine processing of a program. The term "specific processing" refers to processing to which a normal processing branches, such as sub-routine processing or processing by an interrupt or exception handler program. A "specific" case refers to any possible cases which should be handled with the content of a correspondence table stored elsewhere and the normal processing suspended, particularly, an interruption or exception occurring to a processor.

In this invention, when a "specific" case occurs, the then content of the correspondence table is stored elsewhere. If the designated register number held in the table should be updated in the storing process, the storing processing may not be properly executed. In order to avoid abnormal storing processing, updating of the designated register numbers held in the correspondence table is disallowed at least during the storing process.

A data processing apparatus of the present invention may further comprise designated register number returning section for returning the designated register number after the completion of the specific processing, wherein the correspondence table updating allowance/disallowance setting section disallows updating of the designated register number held in the correspondence table over a period covering, not only the process for storing the designated register number, but also the process for returning the designated register numbers back to the correspondence table.

According to the present invention, the content of the correspondence table which was read from the table and stored elsewhere is returned to the table. If the designated register number held in the table should be updated in the returning process, that returning processing and another storing processing to be executed for another "specific" case may not be performed properly. Therefore, the correspondence table updating allowance/disallowance setting section disallows updating of the designated register numbers not only during a storing process after a "specific" case occurred, but also during a returning process for the operating flow to return to where the flow last branched.

Further, in the above data processing apparatus, the correspondence table may hold a predetermined number of register numbers in instruction words preceding a current instruction word which were designated as destination registers for storing results of the operation, and selected in an order of recent designation.

In general, an instruction includes a register operand for designating a source register which contains data to be used in an operation, and that for a destination register for storing data on the operation result. Which of a register number and a register designation code is used to designate a register in an instruction can be desirably determined. According to this invention, a predetermined number of designated destination register numbers are selected in an order of more recently designation, from those which were thus designated by current and preceding instructions, and set corresponding to register designation codes via the correspondence table.

BRIEF DESCRIPTION OF THE DRAWINGS

The above and other objects, features, and advantages of the present invention will become further apparent from the following description of the preferred embodiment taken in conjunction with the accompanying drawings wherein:

FIG. 2 is a schematic diagram showing an example of the structure of a status register; and FIG. 3 is a table showing an example of a schematic flow of an interrupt process.

DESCRIPTION OF THE PREFERRED EMBODIMENT

Figure 1:
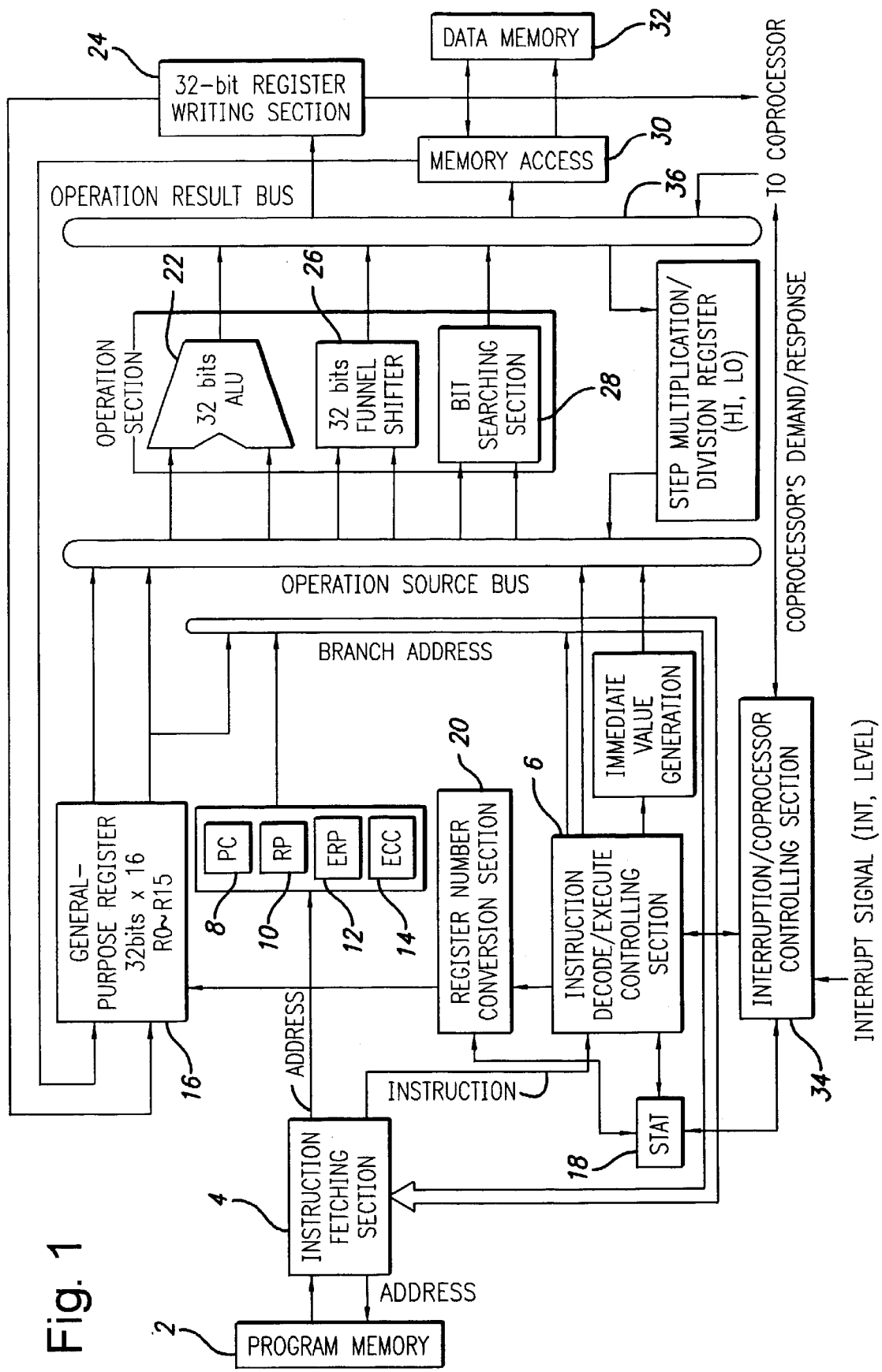
FIG. 1 is a diagram showing a complete structure of a data processing apparatus according to a preferred embodiment of this invention.

In the following, a preferred embodiment of a data processing apparatus of the present invention will be described with reference to the accompanying drawings.

Referring to FIG. 1 showing the complete structure of the data processing apparatus which is a microprocessor here, a program memory 2 is loaded with instructions, such as a data transfer instruction (a load instruction, a store instruction), so that an instruction fetching section 4 sequentially fetches the instructions to supply them to an instruction decode/execute controlling section 6. At the same time, an instruction address is informed to a program counter (PC) 8 so that the counter 8 shows the informed address. The PC 8 is incremented each time of fetching an instruction.

A return pointer (RP) 10 is informed of a return address from a sub-routine when calling for a sub-routine. An exception/interrupt return pointer (ERP) 12 is informed of a return address from an interrupt or exception process when an interruption or an exceptional case occurs. An exception factor code register (ECC) 14 is informed of a factor code of a recently occurring exceptional case. An effective branch address is determined through selection from those generated by the PC 8, the RP 10, and the ERP 12, and by decoding an instruction. The effective branch address is an address to be next referred to as an instruction address, and set to the PC 8.

Having received an instruction from the section 4, the instruction decode/execute controlling section 6 divides the instruction code into fields according to the type of the instruction so as to detect the type of an operation instructed to be executed, an immediate operand (an operand embedded in an operation code), a source register number, and a destination register number (the number of a storage register). Then, the section 6 reads the content of one of the general-purpose registers 15 designated as a source register.

The apparatus of this embodiment has sixteen general purpose registers 16 each identified by a four-bit register number. The apparatus can respond to an instruction word having a 32-bit or 16-bit length described according to the three-register-operand method, in which two source registers and one destination registers can be designated at the same time. In the 16-bit instruction used by this apparatus, two registers are designated each by a register number of a standard length, or four bits, and one register by a register designation code of two bits. Therefore, the number of bits necessary to designate register operands can be stored, so that the entire instruction word including an operation code and so forth can be formed using a total of sixteen bits.

A two-bit register designation code can discriminatingly designate four different values which are set corresponding to four register numbers. Correspondence between a register designation code and a register number is defined by a correspondence table. In this apparatus, correspondence between three register designation codes and as many register numbers is shown in a status register (STAT) 18, while that of the remaining one pair is shown in a register number conversion section 20. One of the characteristic features of this apparatus lies in the fact that the register numbers set in the STAT 18 and the conversion section 20 correspond to the register designation codes and can be read out.

The controlling section 6 reads a register operand included in an instruction word, and informs the conversion section 20 of the operand. If the conversion section 20 is informed of a two-bit register designation code, the conversion section 20 converts the code into any of the register numbers held in the STAT 18 and that of a current designation register CD, or a destination register designated by the current instruction word, which is also informed by the controlling section 6. Referring to the converted register number, the controlling section 6 accesses the aimed register among the general-purpose registers.

When the operation code in the instruction word designates some operation such as an addition, the 32-bit ALU 22 executes the designated operation using source operands obtained, and writes the operation result via a register writing section 24 into one of the general-purpose registers 16 designated as a destination register. Also, when a shift operation is designated, a 32-bit funnel shifter 26 conducts a shift operation using the source operands obtained. For a search operation, a bit searching section 28 conducts a bit-search operation with respect to data in a register.

Differing from the above, when the operation code designates an operation for storing data into a memory (a store instruction), data is read from the general-purpose-registers 16 and written via a memory access section 30 into a data memory 32 according to the address data prepared by the ALU 22. When the operation code designates an operation for reading data from a memory to be loading elsewhere (a load instruction), some data is read from the data memory 32 according to the address data prepared by the ALU 22 and written into one of the general-purpose registers 16 designated by the instruction.

An interruption coprocessor controlling section 34 controls, in response to an externally supplied interrupt signal (INT) and interrupt priority level signal (LEVEL), an interrupt process and an exception process as predetermined referring to the content of the STAT 18 and the internal state of the controlling section 6. The controlling section 34 also controls demands and responses with respect to coprocessors.

Referring to FIG. 2 showing a schematic structure of the STAT 18, "CPS2" and "CPS1" held in the $31^{st}$ to $28^{th}$ bits and the $27^{th}$ to $24^{th}$ bits, respectively, designate the numbers of coprocessors which interface via special registers SR8 to SR11, and SR12 to SR15, respectively. Note that, besides the special registers SR8 to SR15 (not shown) for interfacing with coprocessors, special registers SR0 to SR 7 are used as aforementioned PR 10, ERP 12, ECC 14, and STAT 18.

"PPPD", "PPD", and "PD" respectively expressed by the $23^{rd}$ to $20^{th}$ bits, the $19^{th}$ to $16^{th}$ bits, and the $15^{th}$ to $12^{th}$ bits of the STAT 18 indicate register numbers which are set corresponding to three types of register designate codes. Specifically, the "PD" field holds the number of a register which was designated as a destination register by the most recently used destination operand. The "PPD" field holds the registration number equal to that which was held by the PD field at the most recent updating of the PD value. In other words, the value held in the PPD field is equal to the value having been held in the PD field until the most recent updating of the PD value. Similarly, the "PPPD" field holds the registration number equal to that which was held in the PPPD field at the most recent updating of the PPPD value. In other words, the value held in the PPPD field is equal to the value having been held in the PD field until the second most recent updating of the PD value. In short, "PD", "PPD", and "PPPD" store the numbers of three most recently designated destination registers in this order.

Generally, a register which was designated as a destination register may likely be designated as a source register at a future step in executing a program. Also, a destination register designated at a closer past step will more likely be designated as a source register than that which was designated at a farther past step. Utilizing this characteristic nature, the apparatus of this invention improves the effectiveness of the three-register-operand method using a register designation code. Specifically, as described above, the number of a destination register designated by the current instruction, or CD, and that of three destination registers used in the immediate past, or PD, PPD, PPPD, are set corresponding to the register designation codes.

"IE" expressed the $11^{th}$ to $8^{th}$ bits of the STAT 18 indicates an interrupt enable (IE) level and takes values 0 to 15. This apparatus compares the IE and an externally supplied LEVEL of an interruption to determine whether or not to allow 25 receipt of an interruption. The interrupt coprocessor controlling section 34 is responsible for making this decision.

Next, an operation for storing/returning a designated register number which is held in the correspondence table will be described.

As described above, according to the apparatus of this invention, it is possible to read three register numbers, PD, PPD, PPPD, from the STAT 18 and one, CD, from the section 20, in which the register numbers are set corresponding to register designation codes. That is, upon receipt of an instruction from the instruction fetching section 4, for reading a predetermined register, the instruction decode/execute controlling section 6 figures out the instruction, and accordingly reads designated one of the PD, PPD, PPPD, and CD register numbers.

In order to read data from the STAT 18, a kind of store instruction (STS instruction) may be used. According to an STS instruction, the instruction decode/execute controlling section 6 reads the content of the STAT 18, and stores it in a stack region provided in the data memory 32. More specifically, in response to an STS instruction, the controlling section 6 reads PD, PPD, PPPD from the STAT 18, and inputs them via an operation source bus into the ALU 22. The ALU 22 passes them through, without conducting an operation using them, outputting them into an operation result bus 36. They are then sent to the memory access section 20 and the data memory 32 to be stored in a stack region provided in the latter. In the above process, the instruction decode/execute controlling section 6 acts as a register number obtaining means and a designated register number storing means.

Besides an STS instruction, a move instruction (MV instruction) may also be used, if necessary, to read a designated register number from the STAT 18, and store the number in a general-purpose register 16 designated by the instruction.

On the other hand, in order to read data from a memory or the like to return them to the correspondence table, a load instruction may be used. Specifically, in response to a load instruction, the data which was held in the STAT 18 and now stored in the stack region in the data memory 32 is sequentially popped from the stack region in the inverse order to which they were stored therein, and returned to the STAT 18. In the above, the instruction decode/execute controlling section 6 acts as a designated register number returning means.

The aforementioned storing and returning of the STAT 18 content, including a designated register number, will be executed in an exception process other than, for example, resetting, i.e., exception and interrupt processes.

In the following, the operation of this apparatus for an exception process other than resetting will be described When an exceptional case other than resetting occurs, the apparatus of this invention carries out a process to deal with such an exceptional case (a specific process). Referring to FIG. 3 showing a schematic flow of an interrupt process, an interruption occurs while the apparatus carries out normal processing for a function A. Since the IE level of the function A is set as 9 (IE=9), the processing for the function A will be interrupted by an interruption with IE=0 to 9, so that the interrupt processing begins. Note that a lower IE level means higher priority. When an interruption with, for example, IE=9 occurs, a return address from the interrupt process is set to the ERP 12 (see line no. 1 in FIG. 3), and an exception allowance (EA) flag is set as EA=0 (line no. 2). With this arrangement, receipt of a further interruption and updating of designated register numbers stored in the STAT 18 are disallowed. Note that, with EA=1, the apparatus is allowed to receive an interruption and to update the designated register numbers stored in the STAT 18. In addition to the above, an exception factor code is supplied to the ECC 14 to be stored therein.

Thereafter, a predetermined address of an interrupt handler program is set to the PC 8 (line no. 3) so as to begin the interrupt handler program. Specifically, the interrupt handler program reads the content of the STAT 18, including designated register numbers PD, PPD, and PPPD, from the STAT 18 and stores the content of the STAT 18 in a stack region (line no. 4). The interrupt handler program also stores the value shown by the ERP 12 (line no. 5) in a stack region which may be the same as or separately provided from the stack region where the content of the STAT 18 is stored. Subsequently, the EA flag is set as EA=1 in response to a SETPR instruction (see line no. 6), upon which the main interrupt processing begins.

Note that since the SETPR instruction has a parameter "8" in this example, the IE level is set as IE=8 (see line no. 6), so that receipt of an interruption with IE=0 to 8 and updating of the designated register numbers are allowed. Then, the main interrupt processing starts.

As described above, when the operating flow shifts from a normal processing to the main interrupt processing, the designated register numbers held in the STAT 18 is read therefrom to be stored elsewhere, while updating of the numbers is disallowed. In the this storing process, the instruction decode/execute controlling section 6 acts as a designated register number storing means.

When the designated register numbers are updated during the processing for storing the numbers, the numbers might not be stored properly. Therefore, in order to ensure proper storing processing, the EA flag is set as EA=0 to disallow updating of the designated register numbers and receipt of a further interruption, as described above. In the above, the interrupt allowance flag EA acts as a correspondence table updating allowance/disallowance setting means for allowing or disallowing updating of the designated register numbers held in the correspondence table.

After the main interrupt processing was completed, the processing for returning to the normal processing for the function A begins (see line nos. 100 to 104). Specifically, the value of the ERP 12 immediately before the last interruption occurred, which is now stored in the stack region, is popped from the stack region and set again to the ERP 12 (line no. 100). In response to this, the EA level was changed to EA=0 to thereby disallow receipt of a further interruption and updating of the designated register numbers. Then, the content of the STAT 18 immediately before the last interruption occurred, which is also now stored in the stack region, is popped from the stack region and set again to the STAT 18 to thereby restore the STAT 18 holding the same content as that immediately before the last interruption (line no. 101). Thereafter, an RETI instruction which instructs to return from the interrupt handler program is executed. In response to an RETI instruction, the value of the ERP 12 is informed to the PC 8 so that the operating flow returns from the interrupt handler program to the normal processing for the function A. At the same time, the EA level is set as EA=1 to allow receipt of an interruption and updating of the designated register numbers.

As described above, prior to the operating flow's returning from the main interrupt processing to the normal processing, updating of the designated register numbers is disallowed using the EA flag as a correspondence table updating allowance/disallowance setting means, during which the content of the STAT 18 is read from the stack region to be returned to the STAT 18. Note that the update is disallowed by setting EA=0 in the above for the purpose of avoiding a possible failure of the returning which might occur if another process such as a debugging should be performed in the returning process.

It should be noted that a stack region can be loaded with data more than one time. Therefore, when another interruption occurs after an interruption occurred and the content of the STAT 18 was pushed to the stack region, the then content of the STAT 18 can be pushed to the same stack region to be stored therein. In other words, an interruption can be received at any time, only if EA=1, even during the processing for the previously received interruption.

In connection with the designated register numbers held in the correspondence table, note that the values of PD, PPD, and PPPD are updated each time a destination register CD is newly designated, as is obvious from their definitions. That is, the current designation register number CD is transferred to the PD field in the STAT 18 every time an instruction is newly fetched. However, prior to this transfer, the register number stored in the PD field is shifted to the PPD field so that the PD field can store the current designation register number CD to be subsequently shifted. In this manner, register numbers respectively stored in the CD, PD, and PPD fields shift to the fields to be stored therein which each store an older designation register number than itself by one in terms of the order of being designated as a destination register. The oldest designated register number of the four, held in the PPPD field, will be lost as overwritten by the number shifted from the PPD field. Although the PD, PPD, and PPPD indicate the numbers of three most recently designated different destination registers in this embodiment, alternatively, they may simply indicate the register numbers of the three most recently designated destination registers regardless whether they are different or same with respect to each other.

According to the present invention, a data processing apparatus can employ the three-operand method which enables effective processing, using an instruction word which is reduced in length through adoption of a register designation code. Particularly, designated register numbers which are set in a correspondence table as corresponding to the register designation codes, can be read from the table for use in more precise and flexible control over the apparatus.

Further, according to the data processing apparatus of this invention, the designated register numbers set in the correspondence table can be read to be stored elsewhere, and the numbers can be returned to the table. That is, when the ongoing processing is discontinued or changed due to an interrupt or exception process, the then content of the table which reflects the result of the processing thus far, can be read from the table and stored elsewhere before it would otherwise be updated in the interrupt or exception process. In addition, before resuming the interrupted processing, the stored data is read from where it has been stored, and returned to the table to thereby restore a correspondence table having the same content as that at the time of interruption.

Further, in a process for storing or returning data for the correspondence table after the occurrence of a specific case, such as an interruption, receipt of a further specific process and updating of the designated register numbers held in the table are disallowed. With this arrangement, processes for storing and returning designated register numbers can be properly executed. This enables the data processing apparatus to normally resume to continue the disconnected processing while using a register designation code which is shorter than a register number.

Further, according to the data processing apparatus of this invention, a predetermined number of register numbers which are currently or recently designated as destination register numbers can be set corresponding to register designation codes. The registers designated by these register numbers are quite likely to be designated as a source register operant at the next step. Therefore, this arrangement can advantageously improve the effectiveness in executing processing according to the three-register-operand method.

What is claimed is:

1. A data processing apparatus using a stored-program method for executing an operation instructed by an instruction word including a register designation code as an operand, comprising:

a plurality of work registers identifiable by register numbers each of a typical number of bits; and a correspondence table for holding at least one of the register numbers as designated register numbers in a state corresponding to register designation codes, wherein each of the register designation codes are in a readable condition and have few bits than the register number the correspondence table being referred to by the data processing apparatus when executing the operation.

2. A data processing apparatus according to claim 1, further comprising:

register number obtaining section for obtaining the designated register number from the correspondence table.

3. A data processing apparatus according to claim 2, further comprising:
designated register number storing section for storing the designated register number read from the correspondence table.

4. A data processing apparatus according to claim 3, further comprising:
designated register number returning section for returning the designated register number stored in the designated register number storing section back to the correspondence table.

5. A data processing apparatus according to claim 3 for executing specific processing, besides normal processing, in response to a process request supplied from either inside or outside thereof, further comprising:
designated register number updating section for updating the designated register number based on a predetermined rule according to the execution of an instruction word; and
correspondence table updating allowance/disallowance setting section for allowing or disallowing updating of the designated register number held in the correspondence table,
the designated register number storing section storing the designated register number in response to the acceptance of the request for the specific processing,
the correspondence table updating allowance/disallowance setting section disallowing updating of the designated register number held in the correspondence table in a period covering the process for storing the designated register number.

6. A data processing apparatus according to claim 4, wherein
the designated register number storing section is capable of saving a number of the designated register numbers read from the correspondence table, and
the designated register number returning section reads the number of the designated register numbers from the designated register number storing section in a reverse order in which the number of the designated register numbers were stored in the register number storing section, and returns them to the correspondence table.

7. A data processing apparatus according to claim 4 for executing specific processing, besides normal processing, in response to a process request supplied from either inside or outside thereof, further comprising:
designated register number updating section for updating the designated register number based on a predetermined rule according to the execution of an instruction word; and
correspondence table updating allowance/disallowance setting section for allowing or disallowing updating of the designated register number held in the correspondence table,
the designated register number storing section storing the designated register number in response to the acceptance of the request for the specific processing,
the correspondence table updating allowance/disallowance setting section disallowing updating of the designated register number held in the correspondence table in a period covering the process for storing the designated register number.

8. A data processing apparatus according to claim 4 for executing specific processing, besides normal processing, in response to a process request supplied from either inside or outside thereof, further comprising:
designated register number updating section for updating the designated register number based on a predetermined rule according to the execution of an instruction word; and
correspondence table updating allowance/disallowance setting section for allowing or disallowing updating of the designated register number held in the correspondence table,
the designated register number storing section storing the designated register number in response to the acceptance of the request for the specific processing,
the designated register number returning section returning the designated register number in response to the completion of the specific processing,
the correspondence table updating allowance/disallowance setting section disallowing updating of the designated register number held in the correspondence table in a period covering the process for storing the designated register number and the process for returning the designated register number back to the correspondence table.

9. A data processing apparatus according to claim 6 for executing specific processing, besides normal processing, in response to a process request supplied from either inside or outside thereof, further comprising:
designated register number updating section for updating the designated register numbers based on a predetermined rule according to the execution of an instruction word; and
correspondence table updating allowance/disallowance setting section for allowing or disallowing updating of the designated register numbers held in the correspondence table,
the designated register number storing section storing the designated register numbers in response to the acceptance of the request for the specific processing,
the correspondence table updating allowance/disallowance setting section disallowing updating of the designated register numbers held in the correspondence table in a period covering the process for storing the designated register numbers.

10. A data processing apparatus according to claim 6 for executing specific processing, besides normal processing, in response to a process request supplied from either inside or outside thereof, further comprising:
designated register number updating section for updating the designated register numbers based on a predetermined rule according to the execution of an instruction word; and
correspondence table updating allowance/disallowance setting section for allowing or disallowing updating of the designated register numbers held in the correspondence table,
the designated register number storing section storing the designated register numbers in response to the acceptance of the request for the specific processing,
the designated register number returning section returning the designated register numbers in response to the completion of the specific processing,
the correspondence table updating allowance/disallowance setting section disallowing updating of the designated register numbers held in the correspondence table in a period covering the process for storing the designated register numbers and the process for returning the designated register numbers back to the correspondence table.

11. A data processing apparatus according to claim 1, wherein the correspondence table holds a predetermined number of register numbers in instruction words preceding a current instruction word which were designated as destination registers for storing results of the operation and selected in an order of more recent designation.

12. A data processing apparatus according to claim 11, further comprising:

register number obtaining section for obtaining the designated register number from the correspondence table.

13. A data processing apparatus according to claim 12, further comprising:

designated register number storing section for storing the designated register number read from the correspondence table.

14. A data processing apparatus according to claim 13, further comprising:

designated register number returning section for returning the designated register number stored in the designated register number storing section back to the correspondence table.

15. A data processing apparatus according to claim 13 for executing specific processing, besides normal processing, in response to a process request supplied from either inside or outside thereof, further comprising:

designated register number updating section for updating the designated register number based on a predetermined rule according to the execution of an instruction word; and correspondence table updating allowance/disallowance setting section for allowing or disallowing updating of the designated register number held in the correspondence table, the designated register number storing section storing the designated register number in response to the acceptance of the request for the specific processing, the correspondence table updating allowance/ disallowance setting section disallowing updating of the designated register number held in the correspondence table in a period covering the process for storing the designated register number.

16. A data processing apparatus according to claim 14 for executing specific processing, besides normal processing, in response to a process request supplied from either inside or outside thereof, further comprising:

designated register number updating section for updating the designated register number based on a predetermined rule according to the execution of an instruction word; and correspondence table updating allowance/disallowance setting section for allowing or disallowing updating of the designated register number held in the correspondence table, the designated register number storing section storing the designated register number in response to the acceptance of the request for the specific processing, the designated register number returning section returning the designated register number in response to the completion of the specific processing, the correspondence table updating allowance/ disallowance setting section disallowing updating of the designated register number held in the correspondence table in a period covering the process for storing the designated register number and the process for returning the designated register number back to the correspondence table.

17. A data processing apparatus according to claim 14, wherein;

the designated register number storing section is capable of saving a number of the designated register numbers read from the correspondence table, and the designated register number returning section reads the number of the designated register numbers from the designated register number storing section in a reverse order in which the number of the designated register numbers were stored in the register number storing section, and returns them to the correspondence table.

* * * * *